United States Patent
Steiman

(10) Patent No.: US 11,693,958 B1
(45) Date of Patent: Jul. 4, 2023

(54) PROCESSING AND STORING EVENT DATA IN A KNOWLEDGE GRAPH FORMAT FOR ANOMALY DETECTION

(71) Applicant: Radiant Security, Inc., Milpitas, CA (US)

(72) Inventor: Barry Steiman, San Ramon, CA (US)

(73) Assignee: RADIANT SECURITY, INC., Milpitas, CA (US)

( * ) Notice: Subject to any disclaimer, the term of this patent is extended or adjusted under 35 U.S.C. 154(b) by 0 days.

(21) Appl. No.: 17/940,523

(22) Filed: Sep. 8, 2022

(51) Int. Cl.
*G06F 21/55* (2013.01)

(52) U.S. Cl.
CPC .......... *G06F 21/554* (2013.01); *G06F 21/552* (2013.01)

(58) Field of Classification Search
CPC ....... G06F 21/55; G06F 21/552; G06F 21/554
See application file for complete search history.

(56) References Cited

U.S. PATENT DOCUMENTS

| | | | | |
|---|---|---|---|---|
| 9,225,730 | B1 * | 12/2015 | Brezinski | G06F 21/00 |
| 9,798,883 | B1 * | 10/2017 | Gil | H04L 63/1433 |
| 10,262,297 | B1 * | 4/2019 | Singh | G06Q 10/0875 |
| 10,339,309 | B1 * | 7/2019 | Kling | G06F 16/9024 |
| 10,803,183 | B2 | 10/2020 | Gil | |
| 10,891,178 | B2 * | 1/2021 | Liu | H04L 41/12 |
| 10,942,952 | B1 * | 3/2021 | Wilczynski | G06F 16/29 |
| 11,250,043 | B2 * | 2/2022 | Van Beest | G06F 16/35 |
| 11,423,143 | B1 * | 8/2022 | Lin | G06F 21/552 |
| 11,544,527 | B2 * | 1/2023 | Shu | G06N 3/049 |
| 2009/0106839 | A1 * | 4/2009 | Cha | H04L 63/1416 726/23 |
| 2011/0277034 | A1 * | 11/2011 | Hanson | G06F 21/554 709/224 |
| 2012/0137367 | A1 * | 5/2012 | Dupont | G06F 21/00 726/25 |
| 2015/0074806 | A1 * | 3/2015 | Roundy | H04L 63/1425 726/23 |
| 2016/0180557 | A1 * | 6/2016 | Yousaf | G06F 21/50 715/762 |
| 2017/0024983 | A1 * | 1/2017 | Reeves | G08B 13/02 |
| 2017/0070523 | A1 * | 3/2017 | Bailey | G06F 16/9535 |
| 2017/0195439 | A1 * | 7/2017 | Dixon | H04L 61/5007 |
| 2017/0324759 | A1 * | 11/2017 | Puri | G06F 11/3452 |
| 2018/0316704 | A1 * | 11/2018 | Joseph Durairaj | G06F 21/316 |
| 2019/0102553 | A1 * | 4/2019 | Herwadkar | G06F 21/6218 |
| 2020/0067952 | A1 * | 2/2020 | Deaguero | H04L 43/08 |
| 2020/0169565 | A1 * | 5/2020 | Badawy | G06F 21/552 |
| 2020/0293657 | A1 * | 9/2020 | Chai | G06F 11/3024 |
| 2021/0034737 | A1 * | 2/2021 | Khan | G06N 3/04 |
| 2021/0194909 | A1 * | 6/2021 | Tang | H04L 63/1416 |
| 2021/0248443 | A1 * | 8/2021 | Shu | H04L 63/1425 |
| 2021/0257060 | A1 * | 8/2021 | Curtis | G16B 20/00 |

* cited by examiner

Primary Examiner — Khang Do
(74) Attorney, Agent, or Firm — Patent Law Works LLP

(57) ABSTRACT

A technique for anomaly detection is disclosed. Event data is converted into a normalized common information model. The resulting data may be stored in an event data store database. Additionally, the resulting data may be stored in a knowledge graph representation in a knowledge graph database. The knowledge graph database efficiently stores event data to generate histograms on demand for common anomaly queries.

20 Claims, 11 Drawing Sheets

PROCESSING AND STORING EVENT DATA IN A KNOWLEDGE GRAPH FORMAT FOR ANOMALY DETECTION

FIELD OF THE INVENTION

The present disclosure generally relates to anomaly detection in information technology (IT) and network environments, including detecting anomalies in event data collected from security monitors.

BACKGROUND

In an IT environment, anomalous behavior detection is one technique that can be used to aid in detecting and assessing potential security risks. For example, anomalous log-in behavior may be an indication of potential security problems in an IT environment, such as an enterprise network environment. More generally, there may be a wide variety of allowed, disallowed, expected, and unexpected behavior of users, devices, and activities that may be of concern. However, conventional anomalous behavior detection approaches require enormous computational resources and data storage to perform behavioral modeling to detect a wide variety of anomalies. Conventionally, extensive computationally expensive behavioral modeling is typically performed prior to receiving an anomaly query.

Implementations of this disclosure were developed in view of these problems.

SUMMARY

A method of anomaly detection uses knowledge graph representation of event data to generate histograms on demand for a set of common anomaly queries. In one implementation event data is monitored in an information technology environment for at least one of machine users and human users. The collected event data is mapped into a common information model and inserted into an event store database. The event data is transformed into a knowledge graph representation in which events are represented by nodes and links between nodes, with the links including attributes of time series data for event activity strings. The knowledge graph representation is selected to store event data to generate histograms on demand for a set of common anomaly queries.

In one implementation, histograms are generated on demand, based on the knowledge graph representation, to answer an anomaly query.

In one implementation, events are qualified in the knowledge graph for persistence.

In one implementation, the links include configuration filters for time series data indicative of one or more values of conditions associated with events.

In one implementation, the monitoring of event data of machine users and human users comprises monitoring at least one of: identity access and management tools, endpoint activity monitoring tools, cloud activity monitoring tools, email activity monitoring tools, network activity monitoring tools, SaaS infrastructure activity monitoring tools, managed device monitoring tools, and IoT monitoring tools.

In one implementation, the knowledge graph representation has a format that represents at least one time/occurrence activity data string in hexadecimal format. In one implementation, the hexadecimal format utilizes a hexadecimal value to represent a single character for four quarters in a day.

In one implantation, two stages of anomaly detection are performed. A first stage of anomaly detection by decoding the knowledge graph representation to generate at least one histogram. A second stage of anomaly detection is performed, using the event data stored in the event store database, to answer anomaly queries not answerable using the knowledge graph representation alone.

In some implementations, the knowledge graph representation is used to index information in the event store database.

In some implementations common information models provide standardized fields to represent event data from a plurality of different proprietary vendor formats.

In some implementations, a system includes an anomaly detection engine configured to perform one or more of the above-described methods.

BRIEF DESCRIPTION OF THE DRAWINGS

The present disclosure is illustrated by way of example, and not by way of limitation, in the figures of the accompanying drawings in which like reference numerals are used to refer to similar elements.

DETAILED DESCRIPTION

Figure 1:
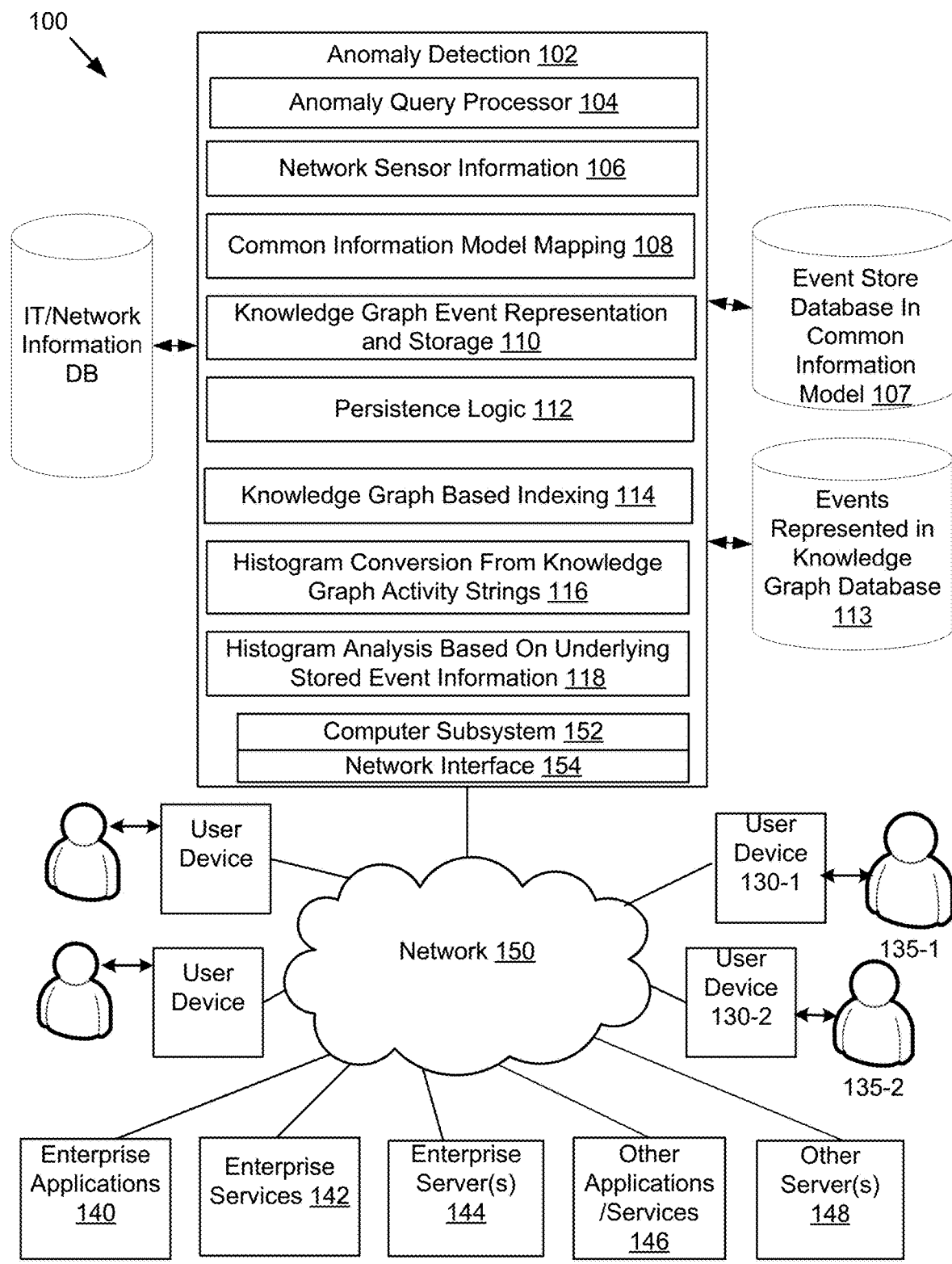
FIG. 1 is a block diagram illustrating a system for anomaly detection in accordance with an implementation.

The present disclosure describes systems and methods for anomaly detection. FIG. 1 is a high-level diagram of an information technology (IT) environment 100 with an anomaly detection engine 102 in accordance with an implementation. The anomaly detection engine 102 includes an anomaly query processor 104 to process queries regarding event information.

The anomaly detection engine 102 may be deployed on an individual enterprise network in some implementations. However, more generally, it may be implemented as a web-based service, network service, or cloud-assisted service that provides anomaly detection services to one or more customers.

Network sensor information unit 106 may, for example, be collected from the IT/network security vendor products/ services used by a particular customer to monitor machine events and human events in an environment, such as an enterprise network as an example. For example, an individual enterprise network may utilize a variety of different vendor tools that provide monitoring and detection, as well as activity telemetry for security services.

The network sensor information unit 106 collects information regarding events. As a few examples, this network sensor information may collect information from one or more sensors regarding information associated with one or more of enterprise applications 140, enterprise services 142, enterprise servers 144, other applications/services 146, and other servers 148 that are part of, or are accessed by, or interact with, an enterprise network environment. The monitoring may include tools that monitor the activity of client devices 130 of individual users 135, such as a client device 130-1 of user 135-1, or client device 130-2 of user 135-2. More generally, an enterprise network 150 (e.g., a local area network (LAN), wide area network (WAN), or other types of networks) may support an arbitrary number of client devices 130 and users 135. For example, an individual customer may have N employees, with each of the N employees having at least one client computing device 130.

Because a variety of different security vendor tools may be used as sources of information, the raw sensor data may be in a variety of different vendor formats. A common information model mapping unit 108 maps sensor data from different monitoring tools into a common information model. For example, sensor data may be gathered from each customer environment (per customer) by normalizing events into a common information model for generalization across sensor sources. This normalized event data in the common information model is then inserted into an event store 107. In parallel, a selected subset of the normalized event data in the common information model is further transformed into a knowledge graph format and stored in a knowledge graph database 113.

Event Data Normalization into Common Information Model

In some implementations, the anomaly detection engine collects event data from one or more security vendors that provide monitoring and detection, as well as activity telemetry for security purposes. The event data may generally correspond to events representing activities of machines (machine users) and human users. As a few examples, this may include user authentication, machine process execution, email transport, Domain Name System (DNS) record resolution by service, network connection, etc. As a few examples, the event data may include logon information, DNS resolution information, email information, file open, file write, and process start information may be collected and analyzed for anomalies.

The event data may be generated from a wide variety of different vendor tools. This may include, as a few examples, event data from identity access and management tools, endpoint activity monitoring tools, cloud activity monitoring tools, email activity monitoring tools, network activity monitoring tools, Software as a Service (SaaS) infrastructure activity monitoring tools, managed device monitoring tools, and Internet of Things (IoT) monitoring tools.

Table 1 below summarizes examples of event categories generally categorized by different types of tools generating events representing the activities of users, including machine users and human users. Table 1 is not exclusive in the sense that it can be expected that vendors will develop, over time, additional sensors and tools.

TABLE 1

| Event Provider Category | Example Vendor/Product | Comments |
| --- | --- | --- |
| IAM (identity and access management) | Microsoft Office 365 ®, Google Workspaces ®, Okta ® | Provides authentication information and identify information for contextual mapping |
| Endpoint activity monitoring | Crowdstrike Falcon ®, Sentinel One ®, Microsoft Defender ® | Provides telemetry of activity as well as detection signals from endpoints covering everything from process activity, file activity and basic network activity |
| Cloud activity monitoring | Microsoft Office 365 ®, Salesforce ®, Box ®, Dropbox ®, Microsoft Sharepoint Online ® | Provides telemetry to applications that authenticate via the cloud and sends telemetry about activity that happens in those specific applications |
| Email activity monitoring | Microsoft Exchange Online ® | Provides events that track emails via logs such as delivery logs, spam detection logs that can explain what happens to a certain email |
| Network activity monitoring | Palo Alto Networks Firewall ® | Provides access telemetry events and summaries that track access control over the network, specifically access between devices and networks |
| SaaS infrastructure activity monitoring | Amazon AWS ®, Microsoft Azure ®, Google Cloud ® | Provides telemetry on native infrastructure access and configuration such as storage, application, access usage |
| Managed devices monitoring | Intune ®, Apple MDM ®, Jamf ® | Provides telemetry and events on mobile devices owned by the corporate, similar to endpoint devices (phones, tablets, smart devices) |
| IOT monitoring | Armis ® | Provides telemetry events on activity and access to industrial devices as well as fingerprints |

There are general types of event information for different individual sensor products. The collected event information is transformed into a common information model.

As an example, consider the examples of events listed below as examples of events that may be transformed into a common information model:

email-received Email Received
email-distributed Email Distributed
email-received-failed Email Receive Failure
dns-response DNS Response
logon-local Local Logon
logon-remote Remote Logon
logon-application Application Logon
exchange-inboxrule Exchange Inbox Rule Operation
file-open File Open
file-write File Write
process-start Process Start Table 2, below, illustrates general fields for a received email in an example of a common information model representation of email related events.

TABLE 2

| Field | Developer Notes |
|---|---|
| br_eventID | |
| br_category | represents the email category, always equals 'email' |
| br_outcome | the outcome of the email, in O365 represented in field |
| br_vendor | |
| br_product | |
| br_eventName | value = 'email-received-ok' |
| br_type | matches the type of the event |
| timestamp | time of email received |
| emailRecipient | email address of the recipient |
| emailRecipientID | id of the recipient |
| email Sender | email address of the sender. This gets mapped to an attribute on the externalUser object |
| email SenderID | id of the sender. This gets mapped to an attribute on the externalUser object |
| email Subject | |
| messageID | |
| org | the organization that receives and manages the mailboxes. if url, needs to be normalized from the first octet. |
| bytes | the byte size of the message, in o365 it comes from the field |
| srcHost | the server that sent this email |
| srcIP | the ip of the server that sent this email |
| user | correlated from recipient email address |
| userID | correlated from recipient |

Table 3 below illustrates general fields in an example common information model for domain name system (DNS) events.

TABLE 3

| Field | Developer Notes |
|---|---|
| br_eventID | |
| br_category | represents the dns category, always equals 'dns' |
| br_outcome | the outcome of the query (ok or failed) |
| br_vendor | |
| br_product | |
| br_eventName | value = 'dns-response' |
| br_type | matches the type of the event |
| timestamp | time of email received |
| srcHost | the host that originated the DNS inquiry |
| srcIP | the ip that originated the DNS inquiry |
| domain | the domain that was requested and/or resolved |
| dnsServerIP | the ip of the server that was queried |
| os | operating system that is identified on the sensor's host |

One aspect illustrated by Tables 2 and 3 is that fields may be defined in a common information model to 1) define relevant fields of information for an event, 2) define a field format, and 3) optionally enrich the raw sensor data. That is, the raw sensor data is transformed into a common information model that maps data from different vendors into common formats. Consider now examples of event monitoring tools for DNS events and email events. There are many different vendors, each having somewhat different raw data formats. The common information model may define the most relevant common attributes between different vendor formats, creating a normalized common information model.

Consider an example of a raw DNS response data from a commercial vendor, such as from the Crowdstrike Falcon® sensor:

{
"DnsResponseType": "1",
"IP4Records":
"40.126.26.133;20.190.154.136;40.126.26.134;
20.190.154.16;20.190.154.137;20.190.154.17;
40.126.26.132;20.190.154.19;",
"ContextThreadId": "59446963214935",
"aip": "2.2.2.2",
"CNAMERecords":
"ak.privatelink.msidentity.com;www.tm.ak.prd.aad-g.akadns.net;",
"QueryStatus": "0",
"InterfaceIndex": "0",
"event_platform": "Win",
"DualRequest": "1",
"EventOrigin": "1",
"id": "eacf0d24-e888-11ec-9a2b-06e3d57d8f99",
"EffectiveTransmissionClass": "3",
"FirstIP4Record": "1.1.1.1",
"timestamp": "1654843529427",
"event_simpleName": "DnsRequest",
"ContextTimeStamp": "1654843646.092",
"ConfigStateHash": "3765527569",
"ContextProcessId": "3742975043594",
"DomainName": "login.microsoftonline.com",
"ConfigBuild": "1007.3.0015205.1",
"DnsRequestCount": "1",
"Entitlements": "15",
"name": "DnsRequestV4",
"aid": "50912f75f1df408394dcd843f5a91de2",
"cid": "e5h50b2df9f645e7b31872ee58c3fd05",
"RequestType": "28"
}, Below is an example of how the above raw DNS response data from a commercial vendor, such as from the Crowdstrike Falcon® sensor, is transformed into an example of a normalized common information model:

{
"br_eventID":
"ed025cd71ca02b65cf22f1b7443082672250678b74a6e23
0e3f40d1a8b67457",
"br_eventName": "dns-response",
"br_outcome": "ok",
"sensorID": "25217f75f1df408394dcd843f5a91cd1",
"srcIP": "2.2.2.2",
"br_category": "dns",
"br_type": "response",
"timestamp": "2022-06-10T06:47:26.092Z",
"domain": "login.microsoftonline.com",
"os": "windows",
"processID": "3742975043594",
"resolvedIP": "1.1.1.1",
"srcHost": "ACME-PC1",
"br_vendor": "crowdstrike",
"br_product": "crowdstrike_fdr"
}, Consider now an example of email event data from a Microsoft Exchange Online Service®:

{
"PSComputerName": "outlook.office365.com",
"RunspaceId": "0a3cd67d-ce18-4621-a127-6cfd34e0ec5d",
"PSShowComputerName": false,
"Organization": "acme.onmicrosoft.com",
"MessageId":
"<MWHPRO801MB3675D33FF1BF208694CE2FEEC3A
69@MWHPRO801MB3675.namprd08.prod.outlook.com>",
"Received": "2022-06-10T21:11:52.3614218",
"SenderAddress": "recruiting@acme.com",
"RecipientAddress": "jane.doe@acme.com",
"Subject": "Interview—individual contributor—Mike Blight—Bio-Process Engineer",
"Status": "Delivered",

```
"ToIP": null,
"FromIP": "1.1.1.1",
"Size": 36114,
"MessageTraceId":         "67d4681d-02b5-4069-820a-
08da4b25d741",
"StartDate": "2022-06-10T21:02:00+00:00",
"End Date": "2022-06-10T21:12:00+00:00",
"Index": 1
},
```

Consider now the example of how the raw email event data above is transformed in the normalized common information model:

```
{
"br_eventID":
"8037897a17f2cebce63ae53e28224fcfacb1eb6e42201ff41
1b3ca28ac19fbd8",
"br_eventName": "email-received",
"br_category": "email",
"br_outcome": "ok",
"br_type": "received",
"br_vendor": "msoff365",
"br_product": "ms365_exo",
"timestamp": "2022-06-10T21:11:52.361Z",
"emailRecipient": "jane.doe@acme.com",
"user": "jane.doe@acme.com",
"emailSender": "recruiting@acme.com",
"emailSubject": "Interview—individual contributor—Mike Blight—Bio-Process Engineer",
"messageID":
"<MWHPRO801MB3675D33FF1BF208694CE2FEEC3
A69@MWHPRO801MB3675.namprd08.prod.outlook.
com>",
"org": "acme.onmicrosoft.com",
"srcIP": "1.1.1.1",
"bytes": 36114,
"userID":
"2231a909685d9ca59dcd6d7c581d3eec953ac138c179c06
7264b2650d99bd961"
,
"emailSenderID":
"317a08d69b54e32c3a20edb05ca0dfc4fc6798519e127fcee
2f3947fe73b211d",
"emailRecipientID":
"2231a909685d9ca59dcd6d7c581d3eec953ac138c179c067
264b2650d99bd961"
,
"srcHost": null,
"group": null
}
```

Event Store Database And Knowledge Graph Database

Returning to FIG. 1, raw event data is normalized and mapped into the common information model by common information model mapping unit 108. In one implementation, event data in the common information model (a mapped event) arrives to a data persistence and modeling layer and flows into two routes to be stored in the event store database 107 and to a knowledge graph database 113.

In some implementations, the event data that is stored in the event store database 107 may be written into files that are sharded on a cloud based storage service, such as those provided by Amazon Web Services® (AWS) (e.g., AWS S3 as an example) and are partitioned in an easy-to-seek schema (e.g., a schema per tenant such as <tenant-id>/<event-type>/year/month/date/hour/* or other schemas such as <tenant-id>/<event-type>/year/month/date/hour/identity/device/*). The schema for the event store database may be selected to use lookup tools for storage services, such as using AWS Athena® for lookup.

In one implementation, a subset of the normalized event data in the common information model is stored in the knowledge graph database 113. A knowledge graph data format may be designed to support compact and efficient storage of information for common (i.e., frequent) anomaly detection queries and in a format that supports efficient decoding to generate histograms on demand. The knowledge graph data format may also be selected to support the indexing of event data in the event data store 107.

In one implementation, a knowledge graph representation and storage unit 110 generates a knowledge graph representation of event data that is stored in database 113. The knowledge graph database may be implemented in different ways. In one implementation, the knowledge graph database 113 is implemented in AWS Neptune®. Persistence logic 112 may apply one or more rules regarding maintaining/updating events represented in the knowledge graph database 113.

Representing and storing events in a knowledge graph format can be done in a manner that provides extremely efficient storage for answering common types of anomaly queries. A knowledge graph-based indexing unit 114 can be used as an aid to find relevant event data in database 107 if additional event data is needed to answer an anomaly query. In one implementation, the knowledge graph database 113 serves as the index and learning layer on top of the event store database 107.

In one implementation, in the knowledge graph database 113, events are represented by nodes and links between nodes. The persistence logic 112 qualifies events for persistence in the knowledge graph database 113. In one implementation, for every event, the persistence logic 112 qualifies for persistence in the graph in the following manner:

(node)-[link]-(node)

where the node is a vertex and the link represents the event. The link corresponds to an edge of the knowledge graph. As an example, a node may represent an entity and the edge between two nodes may represent time series activity data associated with an event. The link may also have a configuration filter corresponding to a number of different optional fields to store information to generate histograms on demand to answer a wider variety of queries, depending on implementation details.

In one implementation, a node is a "pivotable" attribute of an event that the anomaly detection engine uses to index/learn between it and other nodes, and the link is the representation of an event. In one implementation, pivotable/non-pivotable items are determined by experts (humans) as part of designing the common information model. Pivotable/non-pivotable items may be defined as part of a set of transformation rules that determine how data attributes associated with events will move into the knowledge graph. In one implementation, a field in an event can have a knowledge graph representation mapping that determines if it transforms to a node, transforms into an attribute of a node, and if its directional. As an example, fields may be provided for username, email address, and srcHost, such as:

Field: username>>Graph node: user
Field: emailAddress>>Graph attribute of node: user
Field: srcHost>>Graph node: host+direction=from For example, an event "logon may have the following information:

```
{
eventType="logon"
timestamp=11111111
user=barry
host=macbook1
``` sourceIp=1.2.3.4
geo=US::CA
browser=chrome
}

A graph representation of the event information in this example is as follows:

(n1: user {id:barry})-[e1: event {type: logon}]-(n2: host {id: macbook1}) when using a common information model, the anomaly detection engine 102 determines what information goes to a node, what information may be an attribute of a node, etc. In one implementation, a node is "a pivotable attribute" that allows the anomaly detection engine 102 to traverse between multiple events. For example, "user X did this on device Y and then device Y did that."

The link on the event (the edge) is where modeling happens. Part of the attributes of the edge are:
{
eventType: "event name"
activity: abcdef01234567890
timeLastUpdated: 111111111
}

Additionally, the activity string acts as the time/occurrence modeling string. In one implementation, it is represented in HEX sequence values (0-9 and a-f) which allows a binary representation of 4 bits. This allows us to represent a single character for each day, and activate the bits based on the fact that activity happened within 4 quarters of the day. So in reality we can break a day to 00-06, 06-12, 12-18, 18-00 and then represent if the link/edge occurred during that window by simply transcoding the bit.

In one implementation, once an event maps into the persistence logic 112, there is a check to see if it already occurred in the time window (if so, the process moves on) and if not, the process includes activation of the relevant bit and transcoding. Also, a rule may be included to add a "0" to the string if there has been a gap between the current time and the last update time in full days.

The knowledge graph efficiently stores data to answer common anomaly queries. The data structure of the knowledge graph stores information that can be decoded on demand to generate histograms.

The anomaly detection engine 102 includes histogram conversion from knowledge graph activity strings. In one implementation, decoding logic in histogram conversion unit 116 is provided to decode the knowledge graph and convert the node data and link data (including the activity strings and any data in the configuration filter(s)) into one or more histograms on demand in response to an anomaly query.

Histogram analysis unit 118 performs an analysis to determine normal, abnormal, and new behaviors. If the knowledge graph lacks sufficient data/data resolution to answer an anomaly query, event data in the event store database 107 may be accessed. In some implementations, the knowledge graph may be used as an index to data in the event data store 107.

One aspect of the knowledge graph representation of event data is that the data format can be selected to efficiently store and organize event information to generate histograms on demand to answer common anomaly queries. This effectively means that information is tracked on write but anomaly modeling is done on-read. This means that the anomaly detection engine 102 doesn't have to hold behavioral anomaly models in memory but stores activity history in a highly efficient manner.

In one implementation, configuration filters may be defined to provide information about the condition of certain values of events. In some cases, users want to learn not only the connection between two nodes but also add the condition of certain values of events. In one implementation, this is possible through the configuration of filters, which refer to fields within the event and that define a second layer of depth for an activity. For example, consider the following:

configuration filter: event=logon, fields=(geo, browser)

In this case, in the link/edge of the event, there are additional sections (expanding on the previous example) that is based on values as follows:
{
eventType: "event name"
activity: abcdef01234567890
timeLastUpdated: 111111111
Filters: {
fields(geo, browser): {
"US::CA, chrome": {
activity: abcdef01234567890
timeLastUpdated: 111111111
}
"US::NY, edge": {
activity: abcdef01234567890
timeLastUpdated: 111111111
}
}
}
}

The configuration filter can be used as predefined filters of interest. That is, the configuration filter can be predefined to provide a second layer of depth for an activity. Configuration filters don't necessarily have to be used, but may be optionally used to support answering a wider range of common anomaly queries. In some implementations, a logical layer learns, over time, common anomaly queries and decisions can be made whether to support particular configuration filters. There may be a variety of performance tradeoffs for a particular end-use environment. For example, the configuration filter(s) may be designed to support the knowledge graph storing sufficient data attributes to generate, on demand, histograms to answer a high percentage of common anomaly queries. However, increasing the capabilities of the knowledge graph database beyond some point may come with increased downsides such as increased storage requirements, increased computational requirements, and increased access time in regards to using the knowledge graph database to generate histograms on demand relevant to anomaly queries.

In some implementations, an anomaly query may be converted into a sequence of questions. For example, instead of asking a question like "give me all the occurrences of certain events/conditions between two dates" which will seek across all data in the knowledge graph database, query logic will first ask the knowledge graph "in which time windows this information is available" and then does a secondary search only based on that. That is, rules, an algorithm, or similar approaches may be applied to identify conditions in which an anomaly query is to be re-expressed into a sequence of questions designed to reduce the amount of data that needs to be searched. This reduces the data that must be processed by queries and improves scalability.

As an implementation detail, note that some events may have multiple nodes linked full-mesh on the graph. Some events may have a single node, and for this case it may be linked by having a "blackhole" node that everything can end because it's used only to pull in the information.

The anomaly detection engine 102 may be implemented using a variety of different technologies. It may, for example, be implemented on an enterprise network server, as an internet-based service, or as a cloud-assisted service. In some implementations, the anomaly detection engine 102 is implemented as computer code instructions stored in memory and executed on a processor. For example, the anomaly detection engine 102 may be implemented on a computing device or server having a computer subsystem 152 and a network interface 154.

Figure 2:
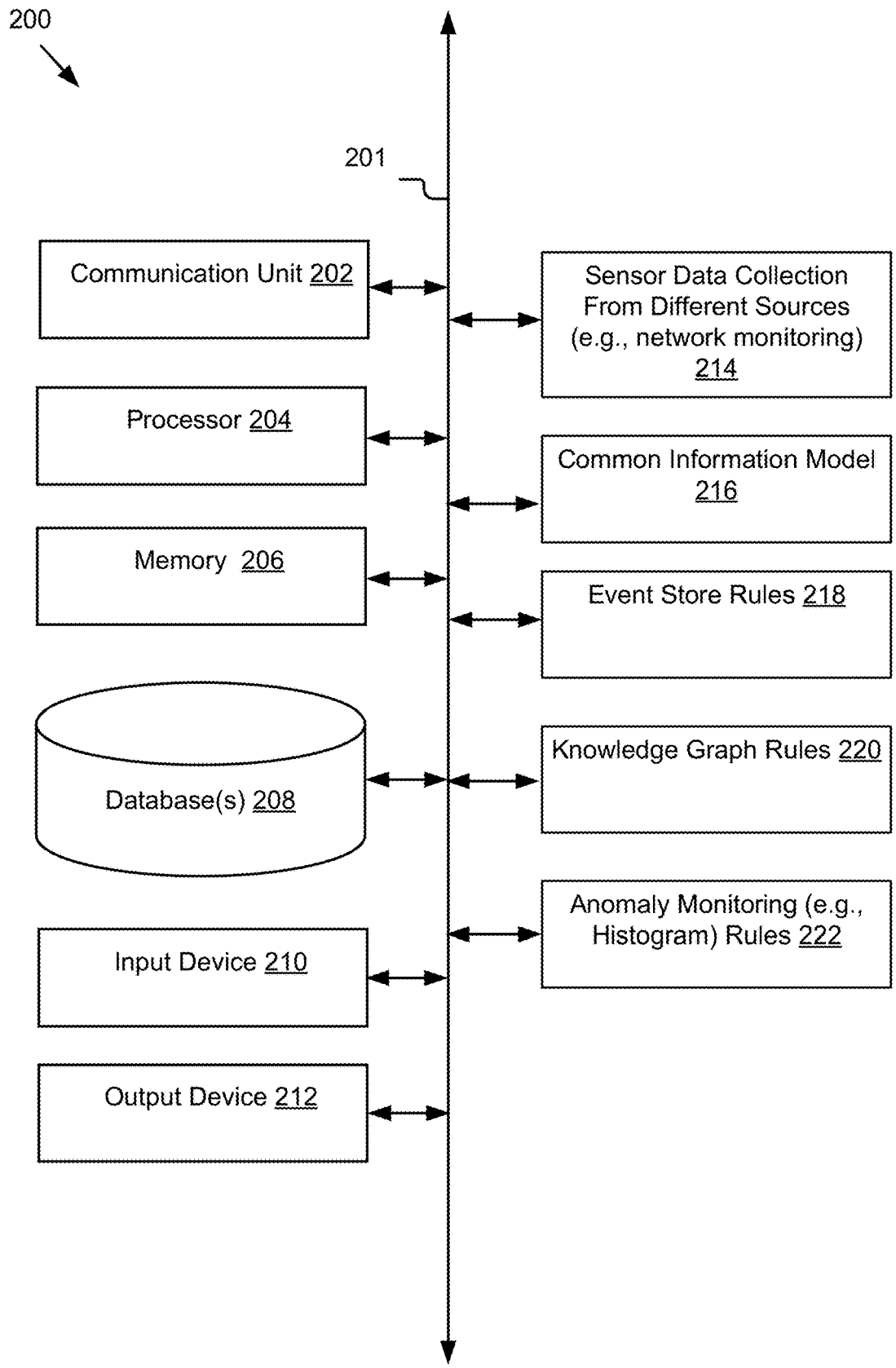
FIG. 2 is a block diagram of a server implementation of an anomaly detector in accordance with an implementation.

FIG. 2 illustrates an example of a server-based implementation 200 in accordance with an implementation. A server may include a communication bus 201, a network communication unit 202, a processor 204, a memory 206, a database 208, an input device 210, and an output device 212. Memory units may store computer program instructions capable of being executed by processor 204, including sensor data collection module 214 to monitor different sources of event information. A common information model module 216 defines formats for storing different sources of event information. For example, different vendors may have different data formats. The common information model module 216 defines vendor-independent common information models having defined data fields. An event store rule 218 defines general rules for storing event data. Knowledge graph rules 220 defines rules for generating a knowledge graph representation of normalized event data. Anomaly monitoring module 222 defines rules for using the knowledge graph representation to answer anomaly queries and detect event anomalies.

Example Knowledge Graph Nodes

Figure 3A:
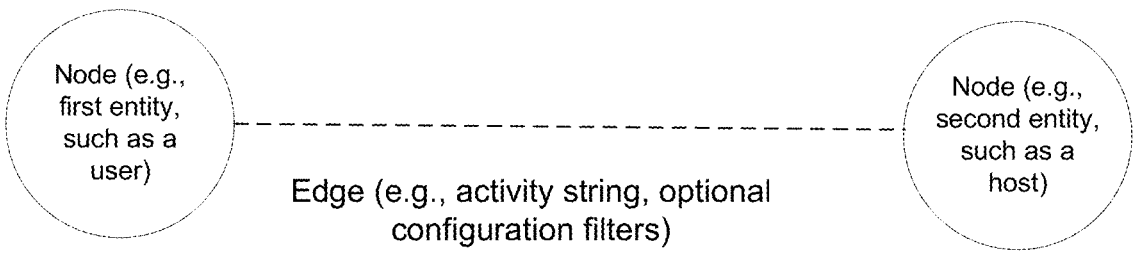
FIGS. 3A and 3B illustrate two examples of nodes and links in accordance with an implementation.
Figure 3B:
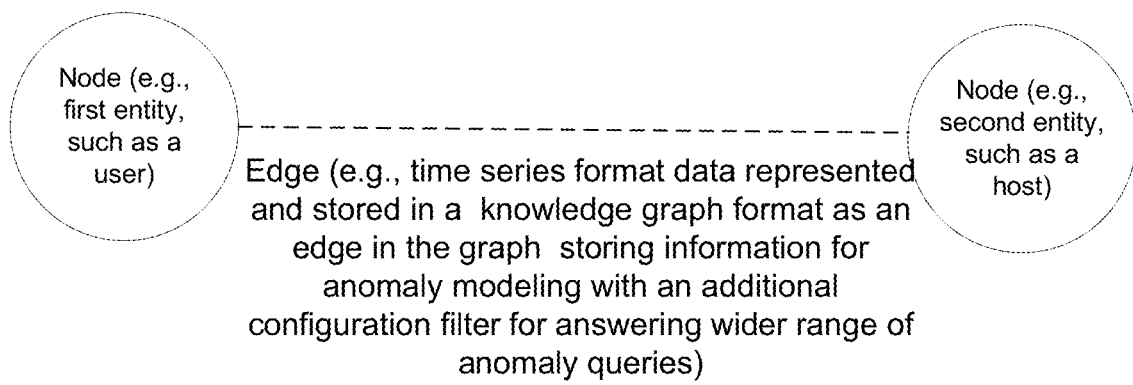

FIG. 3A illustrates an example of the node-link-node representation of information in a knowledge graph. A link between nodes is a graph edge that can be used to store information on an activity string, with optional configuration filters. As illustrated in FIG. 3B, the link may include time series format data with additional configuration filters to provide information for answering a wider range of anomaly queries.

Figure 4A:
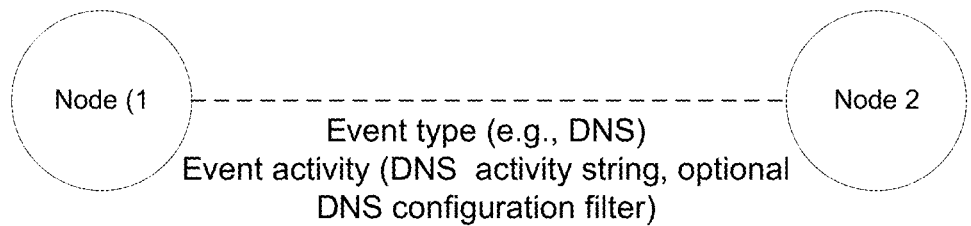
FIGS. 4A, 4B, and 4C illustrate additional examples of nodes and links in accordance with an example.
Figure 4B:
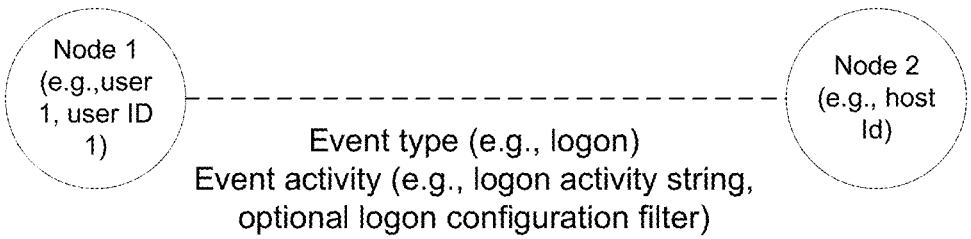
Figure 4C:
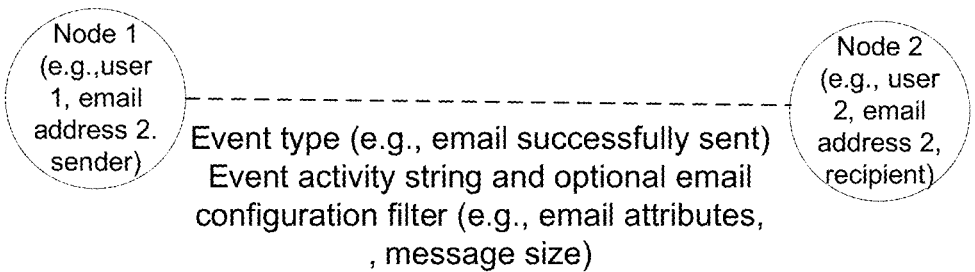

As illustrated by FIG. 4A, as an example, the node-link-node structure may be used to represent monitoring DNS activity. As illustrated in FIG. 4B, the node-link-node structure may be used to represent general logon activity. FIG. 4C illustrates the node-link-node structure used to represent email events, such as successfully sending email. More generally, the node-link-node knowledge graph structure may be used to represent a wide variety of different types of event data.

FIGS. 3A, 3B, 3C, 4A, 4B, and 4C are illustrative but non-limiting examples. More generally, the node-link-node representations may be used to represent a wide variety of different types of events.

Example Methods

Figure 5:
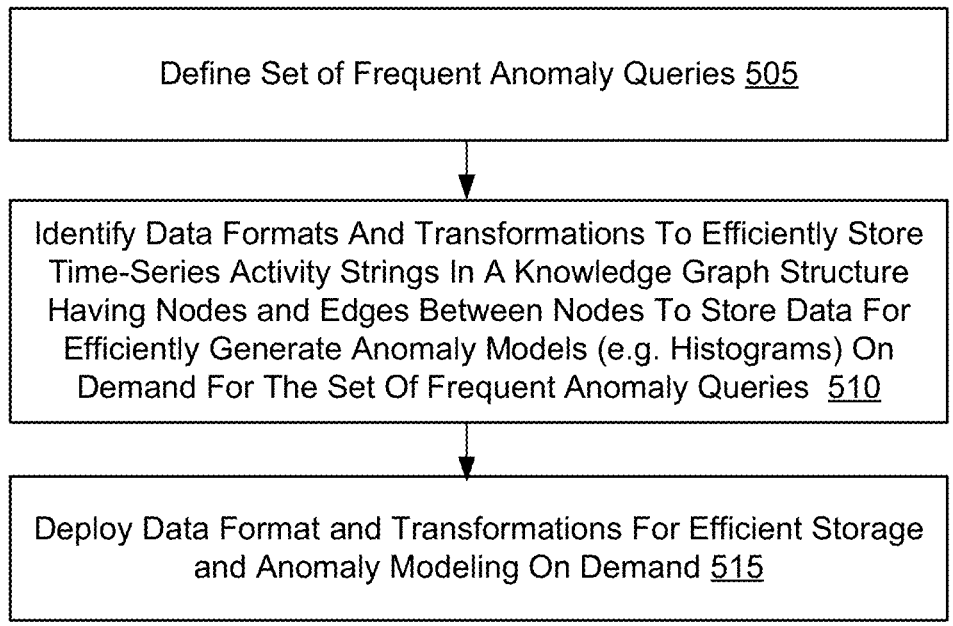
FIG. 5 is a high-level flow chart of an example method for using a knowledge graph representation of normalized event data for anomaly detection in accordance with an implementation.

FIG. 5 illustrates some of the background steps in configuring the anomaly detection system. In block 505, a set of frequent anomaly queries is defined. For example, some types of anomaly queries are likely to be of concern to an IT manager, such as DNS anomalies, logon anomalies, email anomalies, etc. In block 510, data formats for transformation are identified to efficiently store time-series activity strings in a knowledge graph structure. The knowledge graph structure has nodes and edges between nodes. The knowledge graph structure efficiently stores data to generate anomaly models on demand for the set of frequent anomaly queries. In particular, the knowledge graph data structure may efficiently store data for generating histograms on demand for anomaly detection. In block 515 the data format and transformation is deployed.

Figure 6:
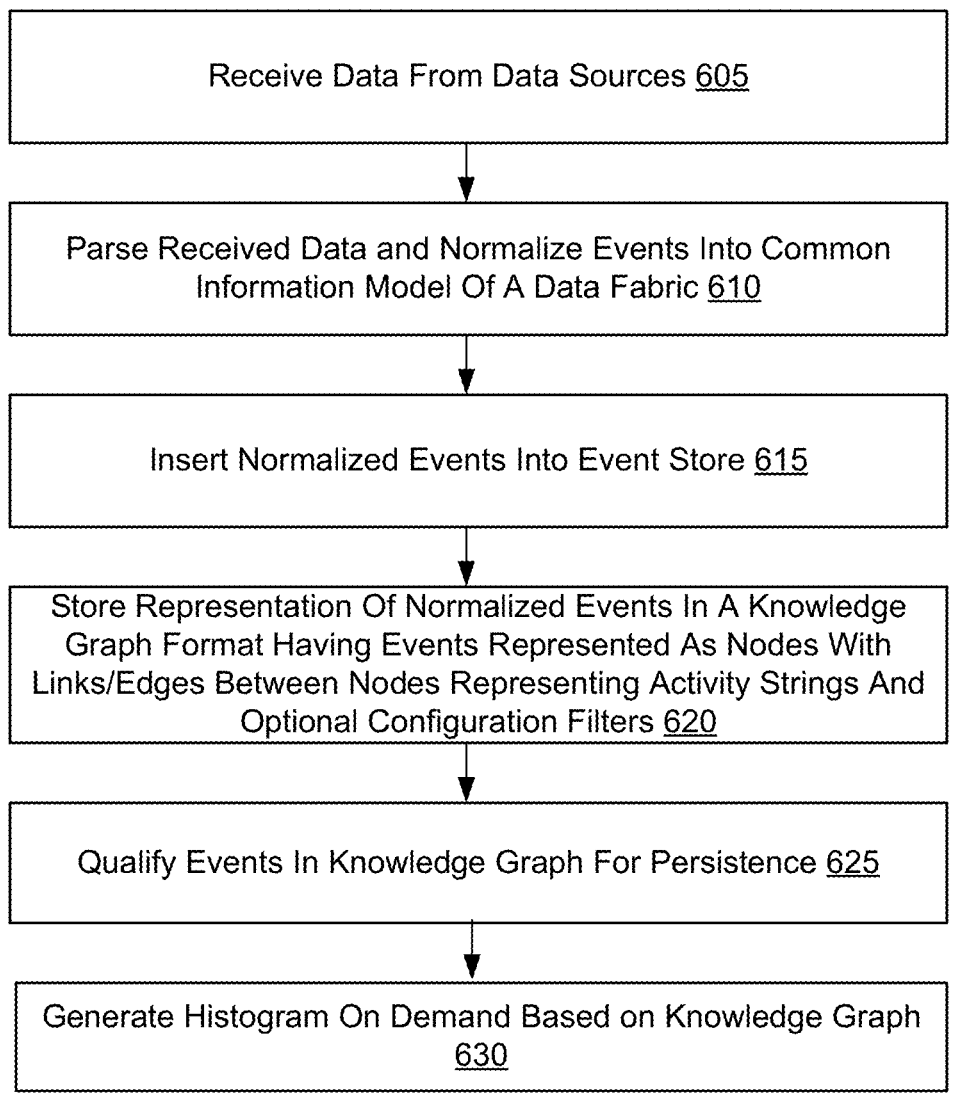
FIG. 6 is a flow chart of an example method for anomaly detection in accordance with an implementation.

FIG. 6 is a high-level flowchart of a method of anomaly detection in accordance with an implementation. In block 605, event data is received from data sources. For example, this may include raw vendor data from different network monitoring tools. In block 610, the event data is parsed and normalized into a common information model. In block 615, the normalized events are stored in the event store. In block 620, a representation of the normalized event data is stored in the knowledge graph format having nodes and links representing activity strings and configuration filters. In block 630, events are qualified in the knowledge graph for persistence. In block 635, histograms are generated on demand based on the knowledge graph.

Figure 7:
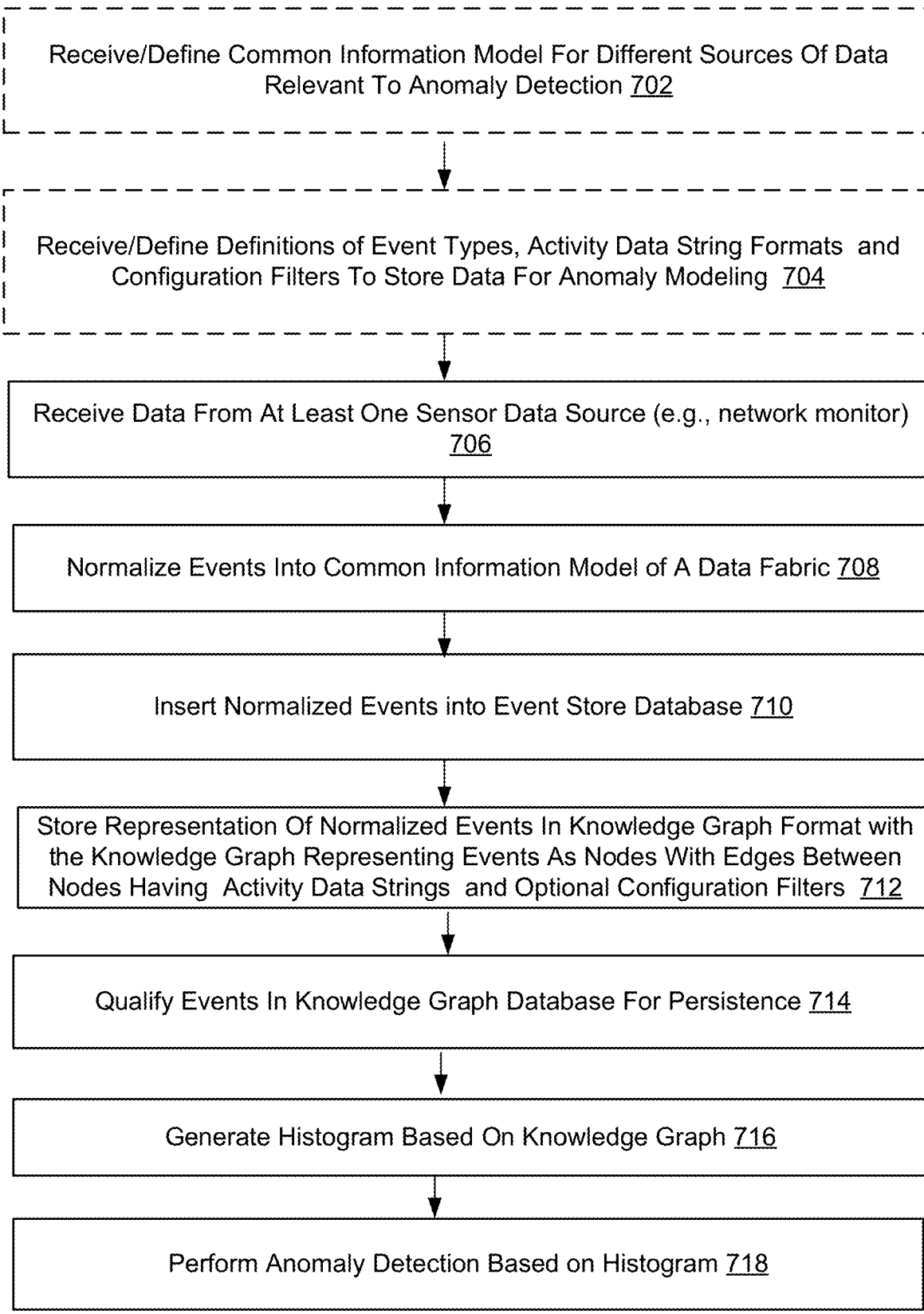
FIG. 7 is a flow chart of an example alternative method for anomaly detection in accordance with an implementation.

FIG. 7 is another example of a flow chart in accordance with an implementation. In block 702, a common information model for different sources of data may be received and/or defined for a particular end-use application. In block 704, definition of event types, activity data string formats, and configuration filters may be received or defined for a particular end-use application. For example, blocks 702 and 704 may include a common information model and node-link-node format applicable to many industries. Alternatively, customization for different end-use applications may be supported. In any case, an anomaly detector is configured/provisioned with the common information model and data transformations into the knowledge graph format. In block 706, event data is received from at least one sensor data source. This data may, for example, be in a proprietary data format of one or more different vendors. In block 708, the event data is normalized into a common information model. This may include, for example, parsing and formatting sensor data into standardized formats. In block 710, the normalized data is inserted into an event store database. In block 712, a knowledge graph representation of normalized event data in the common information model is stored. This is a subset of all of the event data and is formatted as nodes with edges that include activity data strings and optional configuration filters. In block 716, a histogram is generated based on the knowledge graph and the query. The knowledge graph data format is structured with nodes and links such that a simple decoding process allows the data for the histogram to be read from the knowledge graph. In block 718, anomaly detection is performed on the generated histogram. This may include, for example, using statistical techniques to distinguish between normal behavior and anomalous behavior.

Figure 8:
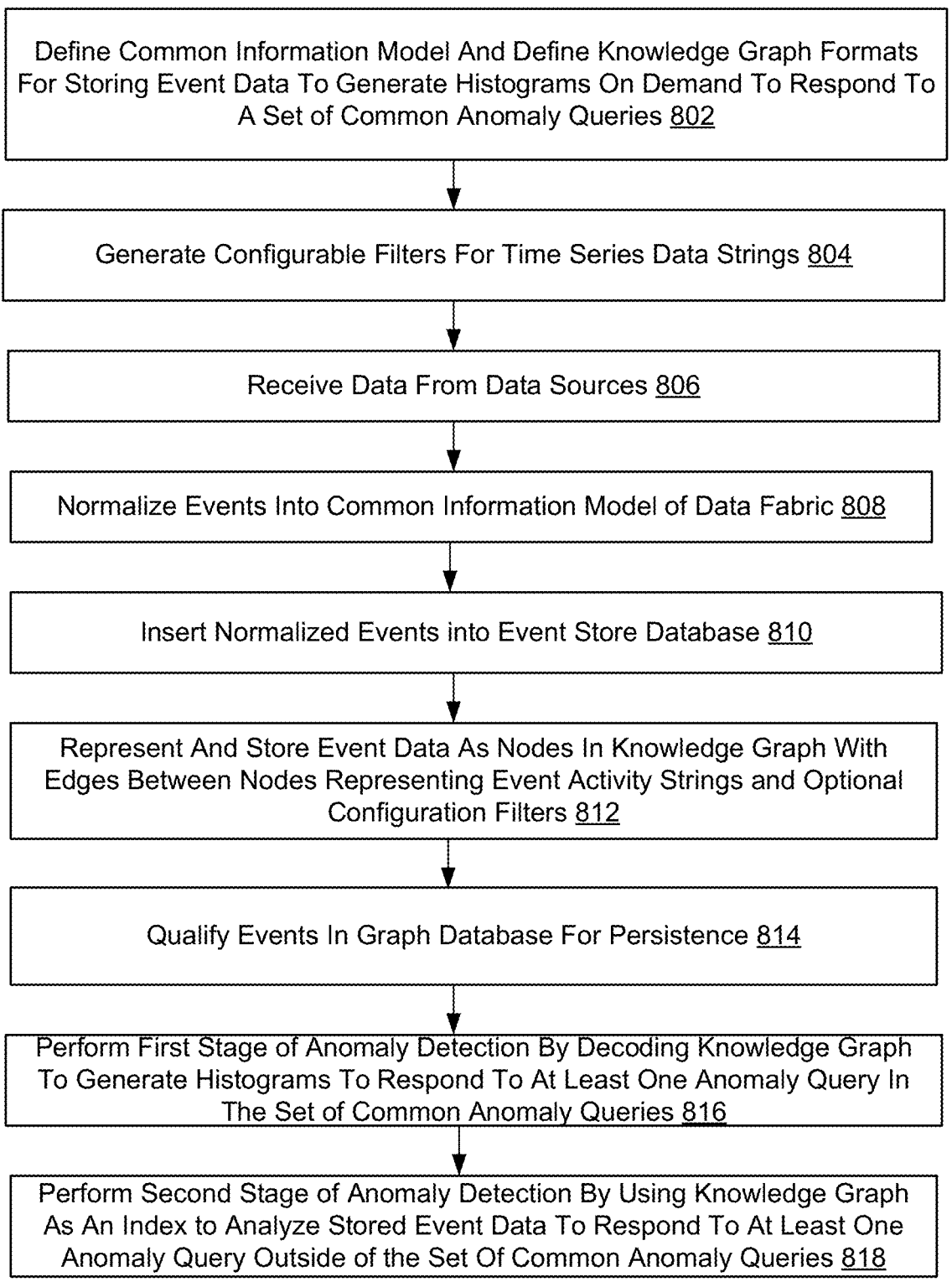
FIG. 8 is a flow chart of an example alternative method for anomaly detection in accordance with an implementation.

FIG. 8 is a flowchart of a method for an example in which there are two stages of anomaly detection. In block 802, a common information model is defined, as well as the knowledge graph format to store event data to generate a histogram on demand for anomaly queries. An end user (e.g., an enterprise) may receive these definitions. Alternatively, they may customize these definitions. In block 804, configurable filters are generated for time series data strings associated with activity data. The configurable filters may, for example, be selected in a provisioning process. Alternatively, the configurable filters may be configured after provisioning. In any case, in some implementations, an IT manager or other responsible party may configure the configurable filters based on the types of anomaly detection queries that are to be supported. In block 806, event data is received from sensor data sources. This may include sensor data in proprietary vendor data formats. In block 808, the event data is normalized into the common information model. In block 810, the normalized events in the common information model are stored in an event store database. In block 812, a knowledge graph representation of a subset of the normalized event data is stored. The knowledge graph data has nodes and links (edges) between nodes representing event activity strings and the configurable filters. In block 814, events are qualified in the knowledge graph for persistence. In block 816, the first stage of anomaly detection is performed in response to a query by decoding the knowledge graph in response to an anomaly query. The knowledge graph is designed to answer common anomaly queries. However, as illustrated in block 818, if the knowledge graph is insufficient for this, a second stage of anomaly detection is used. The knowledge graph may be used as an index to analyze stored event data to answer the anomaly query.

Figure 9:
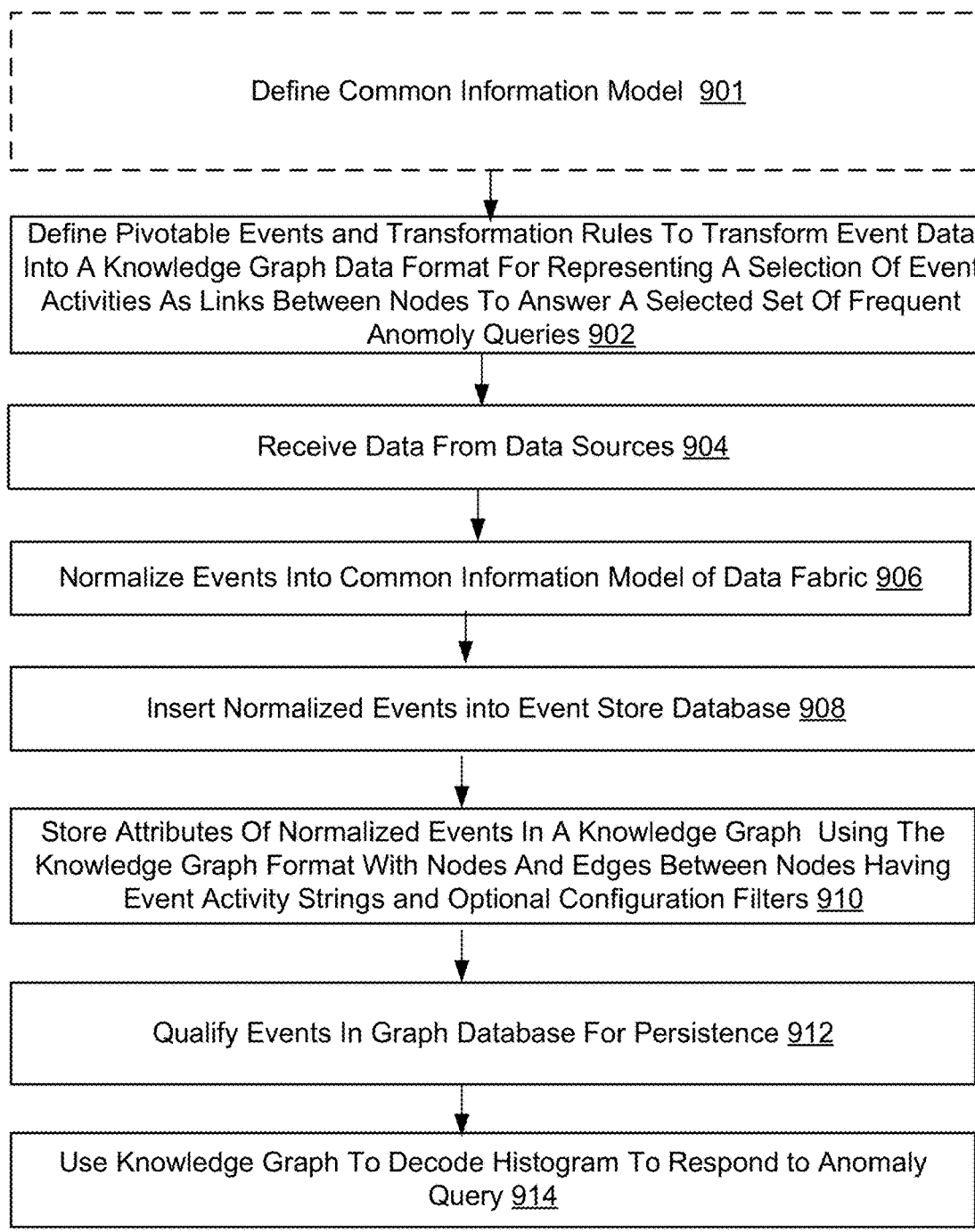
FIG. 9 is a flow chart of an example method for performing anomaly query processing in accordance with an implementation.

Referring to FIG. 9, it should be noted that it is possible that in the future, industry standards may evolve to define common standards for vendors providing tools to monitor IT networks and devices. It's also possible that in the future intermediary services may arise to aggregate data from different vendors into a common format. It's also possible in the future that a large business entity could mandate common formats for vendors. Thus, as illustrated in FIG. 9, a common information model 901 could, in theory, be mandated by an entity or organization. In block 902, transformation rules are defined to transform event data into a knowledge graph format. This may include defining pivotable and non-pivotable events. It may include defining a selection of event activities of links (and optional configuration filters) to answer common (e.g., frequent) anomaly queries. For example, the knowledge graph format (and configuration filters) may be selected based on data regarding the frequency of historical anomaly queries. In block 904, event data is received from data sources (e.g., from one or more IT/network/device security monitoring tools). In block 906, event data is normalized into the common information model of the data fabric. In block 908, normalized events (in the common information model) are inserted into an event store database. In parallel, attributes of the normalized event data are stored in a knowledge graph format representing events as nodes with links (edges) between nodes having event activity strings and optional configuration filters to provide additional event information. In block 912, events are qualified for persistence. In block 914, the knowledge graph is decoded to generate a histogram to respond to the anomaly query. This may be done on demand.

Figure 10:
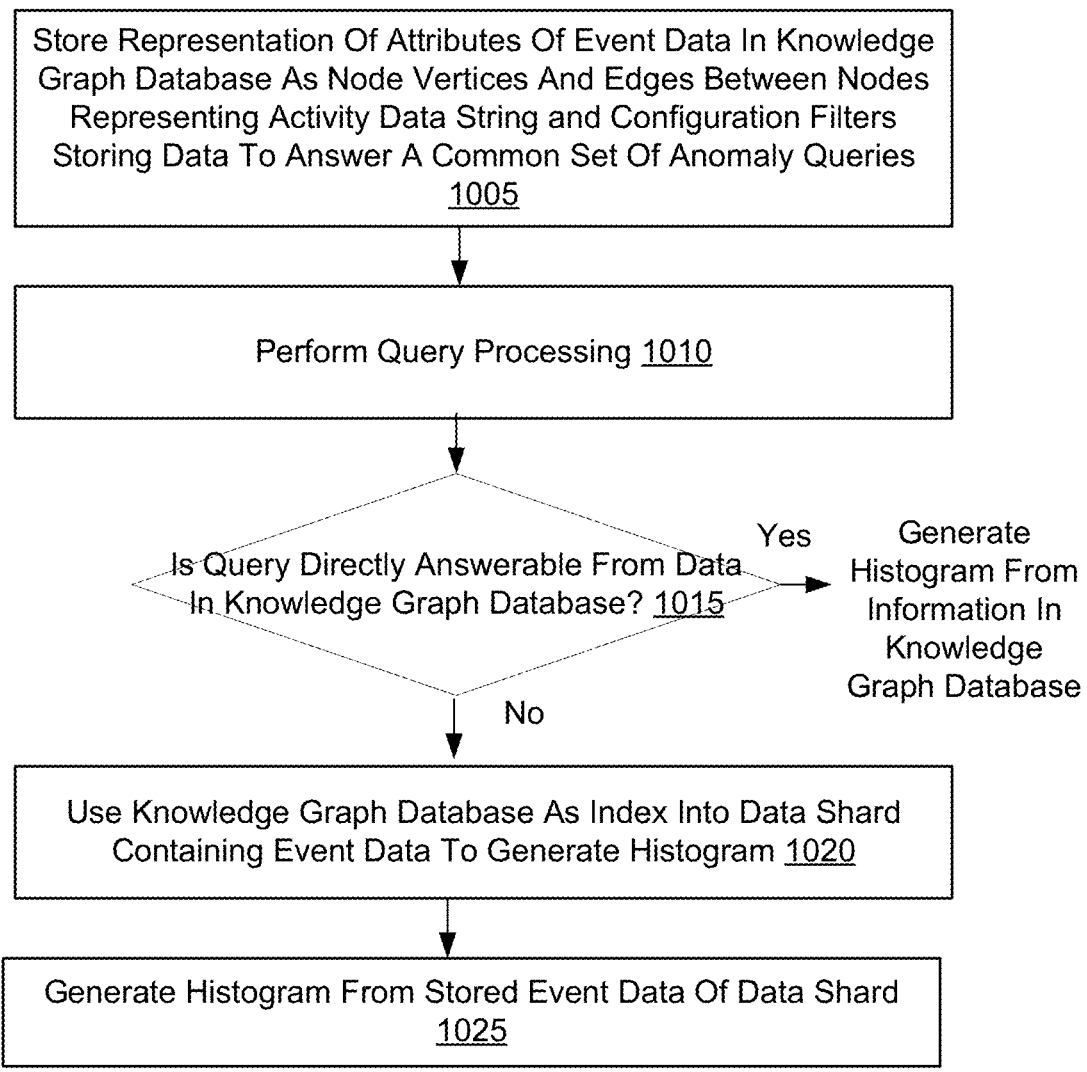
FIG. 10 is a flow chart of an example method for determining whether a query is directly answerable from data in knowledge graph database in accordance with an implementation.

As illustrated in FIG. 10, a method may include determining whether a query is directly answerable from data in the knowledge graph database. For example, data in the knowledge graph database may be at too coarse a level of time resolution to answer some anomaly queries. However, in some cases, the knowledge graph database may be used to help identify (index) event data in the event store database. In block 1005, a representation of attributes of event data is stored in a knowledge graph database as node vertices and edges between nodes representing activity data strings and optional configuration filters to answer a common set of anomaly queries. In block 1010, query processing is performed for an anomaly query. In block 1015, a determination is made if the query is directly answerable from data in the knowledge graph database. If yes, a histogram is generated from information stored in the knowledge graph database. If the determination is no, in block 1020 the knowledge graph database is used as an index into a data shard containing event data to generate a histogram based on the query. For example, the knowledge graph database may have an insufficient resolution to be used to generate a histogram based on the query. However, in some cases, the knowledge graph database may be used to narrow the search into the event data store database. In block 1025, a histogram is generated from the stored event data of the data shard.

Histogram Analysis

In one implementation, the anomaly detection includes histogram analysis. An example histogram analysis algorithm will now be described.

Some of the basic terms for a histogram include the root and leaves. The roots and leaves are the modeled value. For example, if we want to learn all the client device computing machines that are used by username Barry, then the root will be Barry, and each leaf will be a machine. The scope is a determination of a root grouping. A scope can be an individual value such as a user, or it can be a group of values such as a peer group, a network zone, an application group, or a label. It can also be at a higher form of the entire organization. A scope is based on a map.

In one implementation, as event data is classified in a model, a histogram is created for that data with the histogram shaped in a way that the scope and the root are the owners of the histogram, and the leaves are the bins of the histogram. The bins have values that are numeric and represent observations. An observation states how many times a leaf has been seen in the context of the model scope and root.

Figure 11:
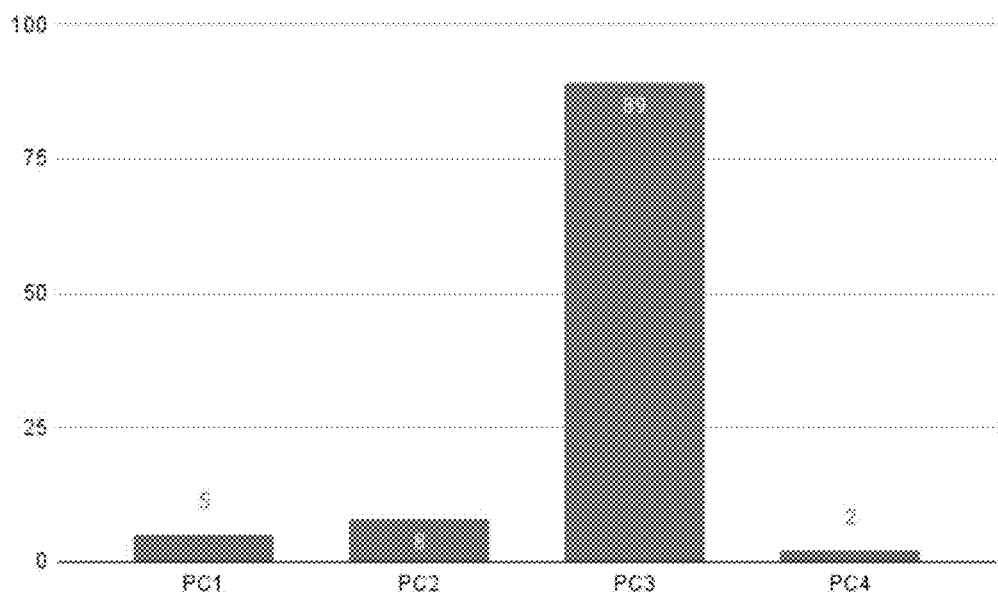
FIG. 11 illustrates the use of a histogram for anomaly detection in accordance with an implementation.

Consider now an example illustrated in FIG. 11, which is a diagram showing a histogram with the root=user and leaf=computer. In this example, let's assume that we decided to model all of the computers that a user named Barry is using on a daily basis. This may include, for example, PC1, PC2, PC3, and PC4. As a few examples, Barry may have a notebook computer at work, one or more home computers, and one or more compact portable devices such as a tablet computer or smartphone. One user named Barry could, in theory, legitimately use a variety of computers in a manner that falls into the category of normal behavior. However, it's also possible Barry uses an excessive number of different computers on a daily basis that falls into the category of anomalous behavior, which might indicate a potential security concern. It's also possible the distribution of use of different computers by Barry is anomalous. For example, if Barry is provided a portable notebook computer by his employer, it's likely he would do most of his work from this primary computer. Depending on a variety of factors, it may be a sign of abnormal behavior for Barry to extensively use secondary computers. There are many possible explanations for anomalous behavior. For example, as one possibility, Barry's logon credentials may have been acquired by a malicious entity using a variety of different computers. Or Barry's home computer may be infected by malware.

A histogram analysis may reveal whether Barry's use of a different computer is abnormal and constitutes an anomaly that is a potential security concern. As an illustrative example, every event that qualifies (let's say an authentication of Barry to a computer) is classified into the histogram that is of scope=user and root=Barry, and the leaf is the computer that Barry is logged into, with each leaf including a count on every occurrence of a login (a leaf count).

Now let's apply a few parameters to the data. Confidence is a convergence calculation that allows a determination to be made if the data is statistically meaningful at its current quantity and whether determination can be made. A Convergence Control is a number that is part of the confidence formula which helps shape the speed of growth of the statistical difference. A Convergence Threshold is a number between 0-1 (normally>=0.8) that represents if the confidence calculation satisfies convergence and if we can rely on the data model for anomaly detection. Minimum Observations is a control that lets the system ignore the model until it has seen enough data. An Anomaly Threshold is a percentile that determines what will be considered normal vs abnormal behavior.

To calculate confidence, the following equation may be used:

$$((ValueSum-LeafCount)/ValueSum)^{\wedge}ConvergenceControl$$

ValueSum=S, LeafCount=L, ConvergenceControl=C $$((S-L)/S)^{\wedge}C$$

As an illustrative example for the example histogram chart of FIG. 11. ValueSum is 104 (5 occurrences for PC1 +8 occurrences for PC2 +89 occurrences for PC3 +2 occurrences for PC4) and the leaf count is 4 (for PC1, PC2, PC3, and PC4). With a convergence control of 3, then the formula will be:

$$((104-4)/104)^{\wedge}3=\sim 0.88$$

Based on the above since our Confidence is 0.88 and our convergence threshold is 0.8 then the confidence of the model is satisfied.

For anomaly detection, there are 3 cases where we will want to compute:
1. Outlier—a value of a leaf previously unobserved, and therefore it is an immediate anomaly until learned.
2. Normal—this is a value that is above the statistical threshold and is considered a "good" normal value. (for example, a good normal value would be expected for the user's main computer being the computer that they log into the most)
3. Abnormal—this is a value that is below the statistical threshold. It may have been seen before but it is rare and therefore is not part of the norm for the root user.

As mentioned earlier, calculating the case of an outlier is trivial since if we see a value that has no bin in the histogram and the histogram is converged then the value is an outlier.

For Normal/Abnormal values the algorithm calculates the model in the following algorithmic sequence:
1. Calculate a percentile threshold by multiplying the Anomaly Threshold with the ValueSum of the histogram. In this example, we use the Anomaly Threshold=0.1 resulting in the following:
AnomalyThreshold*ValueSum=PercentileThreshold
AT*S=PT
104*0.1=10.4
2. Sort the histogram bin values by count: [2,5,8,88]
3. Find the bin that the sum of that bin, and all the smaller bins are equal or greater than our PT (10.4) valuer which in our case is bin 88, with a cumulative sum equals [2+5+8]=15 which is greater/equal to 10.4 (our PT). For sorted data by values [2,5,8,88]:
V< >=PT?
2<10.4
2+5==7<10.4
2+5+8==15>=10.4→threshold found, bin of leave value 8 (PC2 in example)
Normal values: PC2(8), PC3(89)
Abnormal values: PC1(5), PC4(2).

As an example, suppose a calculation results is a sequence of equal values, say in [8,5,2,2] where [2,2] are the low values, and one of them is considered "abnormal" but the other one is "normal" then all equal values will be considered normal.

4. Based on the previous calculation, all leaves with a count below 8 will be considered abnormal, and the rest will be considered normal.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment," "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during the actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method for storing data for anomaly detection, comprising:
    monitoring event data in an information technology (IT) environment for at least one of machine users and human users;
    mapping collected event data into a common information model;
    inserting event data, mapped into the common information model, into an event store database;
    transforming the event data, mapped into the common information model, into a knowledge graph representation in which events are represented by nodes and links between nodes, with the links including attributes of time series data for event activity strings; wherein the knowledge graph representation is selected to store event data to generate histograms on demand for a set of common anomaly queries and to serve as an index into the event store database; and
    performing query processing using the knowledge graph representation as an index into event data in the event store database to answer a selected query.

2. The computer-implemented method of claim 1, further comprising qualifying events in the knowledge graph representation for persistence.

3. The computer-implemented method of claim 1, wherein monitoring event data of at least one of machine users and human users comprises monitoring at least one of: identity access and management tools, endpoint activity monitoring tools, cloud activity monitoring tools, email activity monitoring tools, network activity monitoring tools, SaaS infrastructure activity monitoring tools, managed device monitoring tools, and IoT monitoring tools.

4. The computer-implemented method of claim 1, wherein the knowledge graph representation has a format that represents at least one time/occurrence activity data string in hexadecimal format.

5. The computer-implemented method of claim 4, wherein the hexadecimal format utilizes a hexadecimal value to represent a single character for four quarters in a day.

6. The computer-implemented method of claim 1, wherein the common information model provides standardized fields to represent event data from a plurality of different proprietary vendor formats.

7. A computer-implemented method for storing data for anomaly detection, comprising:
    monitoring event data in an information technology (IT) environment for at least one of machine users and human users;
    mapping collected event data into a common information model;
    inserting event data, mapped into the common information model, into an event store database;
    transforming the event data, mapped into the common information model, into a knowledge graph representation in which events are represented by nodes and links between nodes, with the links including attributes of time series data for event activity strings wherein the links include configuration filters for time series data indicative of one or more values of conditions associated with events, and wherein the knowledge graph representation is selected to store event data to generate histograms on demand for a set of common anomaly queries; and
    performing query processing by using the knowledge graph representation to generate histograms on demand to answer a selected query.

8. The computer-implemented method of claim 7, further comprising:
performing anomaly detection based on the generated histograms.

9. A computer-implemented method for storing data for anomaly detection, comprising:
monitoring event data in an information technology (IT) environment for at least one of machine users and human users;
mapping collected event data into a common information model;
inserting event data, mapped into the common information model, into an event store database;
transforming the event data, mapped into the common information model, into a knowledge graph representation in which events are represented by nodes and links between nodes, with the links including attributes of time series data for event activity strings wherein the links include configuration filters for time series data indicative of one or more values of conditions associated with events, and wherein the knowledge graph representation is selected to store event data to generate histograms on demand for a set of common anomaly queries; and
performing anomaly detection by decoding the knowledge graph representation to generate at least one histogram on demand and using the at least one histogram to identify an anomaly.

10. A computer-implemented method for storing data for anomaly detection, comprising:
monitoring event data in an information technology (IT) environment for at least one of machine users and human users;
mapping collected event data into a common information model;
inserting event data, mapped into the common information model, into an event store database;
transforming the event data, mapped into the common information model, into a knowledge graph representation in which events are represented by nodes and links between nodes, with the links including attributes of time series data for event activity strings, wherein the knowledge graph representation is selected to store event data to generate histograms on demand for a set of common anomaly queries and to serve as an index into the event data for anomaly queries not directly answerable from data in the knowledge graph representation;
performing query processing, including;
in response to a selected query being directly answerable from data in the knowledge graph representation, generating a histogram from the knowledge graph representation to answer the query; and
in response to the selected query not being directly answerable from the knowledge graph representation, using the knowledge graph representation as an index into the event store database to generate a histogram from the event data store to answer the selected query.

11. An anomaly detection system, comprising:
a processor and a memory configured to implement a method including:
monitoring event data in an information technology (IT) environment for at least one of machine users and human users;
mapping collected event data into a common information model;
inserting event data, mapped into the common information model, into an event store database;
transforming the event data, mapped into the common information model, into a knowledge graph representation in which events are represented by nodes and links between nodes, with the links including attributes of time series data for event activity strings; wherein the knowledge graph representation is selected to store event data to generate histograms on demand for a set of common anomaly queries and to serve as an index into the event store database; and
performing query processing using the knowledge graph representation as an index into event data in the event store database to answer a selected query.

12. The system of claim 11, wherein the method further comprises qualifying events in the knowledge graph representation for persistence.

13. The system of claim 11, wherein monitoring event data of at least one of machine users and human users comprises monitoring at least one of: identity access and management tools, endpoint activity monitoring tools, cloud activity monitoring tools, email activity monitoring tools, network activity monitoring tools, SaaS infrastructure activity monitoring tools, managed device monitoring tools, and IoT monitoring tools.

14. The system of claim 11, wherein the knowledge graph representation has a format that represents at least one time/occurrence activity data string in hexadecimal format.

15. The system of claim 14, wherein the hexadecimal format utilizes a hexadecimal value to represent a single character for four quarters in a day.

16. The system of claim 11, wherein the common information model provides standardized fields to represent event data from a plurality of different proprietary vendor formats.

17. A system comprising:
a processor and a memory configured to implement a method including:
monitoring event data in an information technology (IT) environment for at least one of machine users and human users;
mapping collected event data into a common information model;
inserting event data, mapped into the common information model, into an event store database;
transforming the event data, mapped into the common information model, into a knowledge graph representation in which events are represented by nodes and links between nodes, with the links including attributes of time series data for event activity strings wherein the links include configuration filters for time series data indicative of one or more values of conditions associated with events, and wherein the knowledge graph representation is selected to store event data to generate histograms on demand for a set of common anomaly queries; and
performing query processing using the knowledge graph representation to generate histograms on demand to answer a selected query.

18. The system of claim 17, wherein the method further comprises:
performing anomaly detection based on the generated histograms.

19. A system comprising:
a processor and a memory configured to implement a method including:
- monitoring event data in an information technology (IT) environment for at least one of machine users and human users;
- mapping collected event data into a common information model;
- inserting event data, mapped into the common information model, into an event store database;
- transforming the event data, mapped into the common information model, into a knowledge graph representation in which events are represented by nodes and links between nodes, with the links including attributes of time series data for event activity strings wherein the links include configuration filters for time series data indicative of one or more values of conditions associated with events, and wherein the knowledge graph representation is selected to store event data to generate histograms on demand for a set of common anomaly queries; and
- performing anomaly detection by decoding the knowledge graph representation to generate at least one histogram on demand and using the at least one histogram to identify an anomaly.

20. A system comprising:
a processor and a memory configured to implement a method including:
- monitoring event data in an information technology (IT) environment for at least one of machine users and human users;
- mapping collected event data into a common information model;
- inserting event data, mapped into the common information model, into an event store database;
- transforming the event data, mapped into the common information model, into a knowledge graph representation in which events are represented by nodes and links between nodes, with the links including attributes of time series data for event activity strings, wherein the knowledge graph representation is selected to store event data to generate histograms on demand for a set of common anomaly queries and to serve as an index into the event data for anomaly queries not directly answerable from data in the knowledge graph representation;
- performing query processing, including:
  - in response to a selected query being directly answerable from data in the knowledge graph representation, generating a histogram from the knowledge graph representation to answer the query; and
  - in response to the selected query not being directly answerable from the knowledge graph representation, using the knowledge graph representation as an index into the event store database to generate a histogram from the event data store to answer the selected query.

* * * * *